United States Patent
Cadle et al.

(10) Patent No.: US 6,422,755 B1
(45) Date of Patent: Jul. 23, 2002

(54) PRECISELY REPOSITIONING POWDER METAL COMPONENTS

(75) Inventors: Terry M. Cadle, Wauwatosa; Lawrence E. Eckstein, Beaver Dam, both of WI (US)

(73) Assignee: GKN Sinter Metals-Germantown, Inc., Germantown, WI (US)

( * ) Notice: Subject to any disclaimer, the term of this patent is extended or adjusted under 35 U.S.C. 154(b) by 0 days.

(21) Appl. No.: 09/527,791

(22) Filed: Mar. 17, 2000

Related U.S. Application Data

(63) Continuation-in-part of application No. 09/155,781, filed as application No. PCT/US97/04050 on Mar. 12, 1997.
(60) Provisional application No. 60/168,245, filed on Dec. 1, 1999, and provisional application No. 60/016,852, filed on May 3, 1996.

(51) Int. Cl.$^7$ ................................................. F16C 17/02
(52) U.S. Cl. ....................... 384/433; 384/432; 384/430; 29/888.092
(58) Field of Search ................................ 384/433, 432, 384/430, 429, 294; 29/888.092

(56) References Cited

U.S. PATENT DOCUMENTS

| | | |
|---|---|---|
| 2,560,413 A | 7/1951 | Carlson |
| 5,501,529 A | 3/1996 | Cadle et al. ................ 384/432 |
| 5,536,089 A | 7/1996 | Weber et al. ................ 384/294 |
| 5,878,323 A * | 3/1999 | Sakai et al. ............ 29/888.092 |
| 6,055,884 A * | 5/2000 | Lantz et al. ................ 384/294 |

FOREIGN PATENT DOCUMENTS

| | | |
|---|---|---|
| CH | 381 015 | 10/1964 |
| DE | 39 04 020 A | 8/1990 |
| DE | 39 04 020 A1 | 8/1990 |

* cited by examiner

Primary Examiner—Lenard A. Footland
(74) Attorney, Agent, or Firm—Quarles & Brady LLP

(57) ABSTRACT

A sintered powder metal (P/M) component has an integrally formed tapered boss surrounding its bolt hole which extends into counterbores in a component to which it is assembled and produces plastic conformance between the boss and the counterbore when the boss is seated in the counterbore. The P/M component can then be removed from the other component and reassembled to it, with the boss fitting perfectly back into the bore with the plastically deformed surfaces fitting back together precisely to determine the relative positioning of the two components. The boss is tapered, a moat may surround it, and the boss may be provided with axial splines and/or be oblong in the axial direction. Bosses such as these may be applied to two components in general, at least one of which is powder metal, such as a main bearing cap, a sensor ring for measuring the timing of an internal combustion engine and a connecting rod bearing cap. Such bosses may also be applied to a casting insert in which the boss is crushed when the die is closed so as to seal off the surrounded hole during casting.

14 Claims, 12 Drawing Sheets

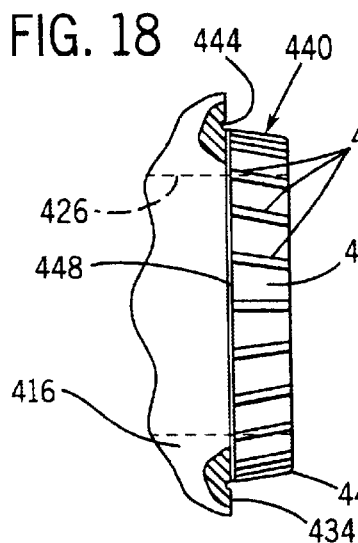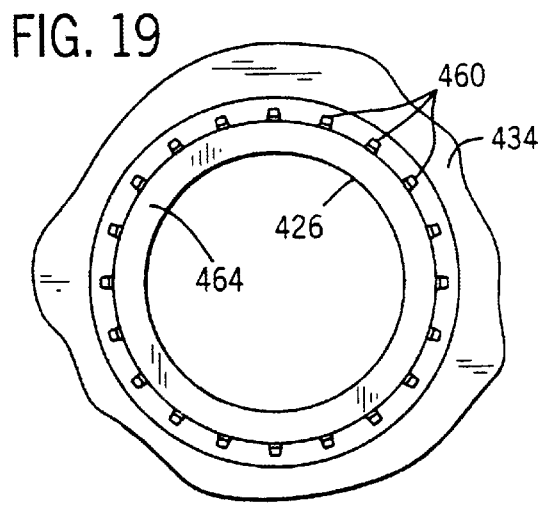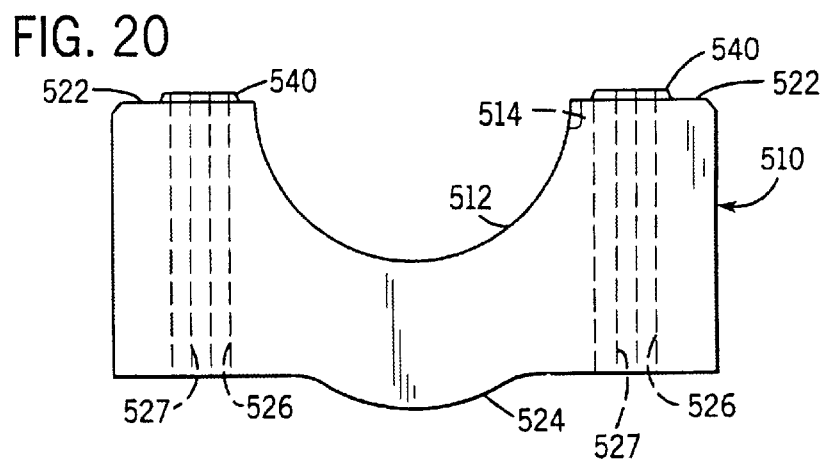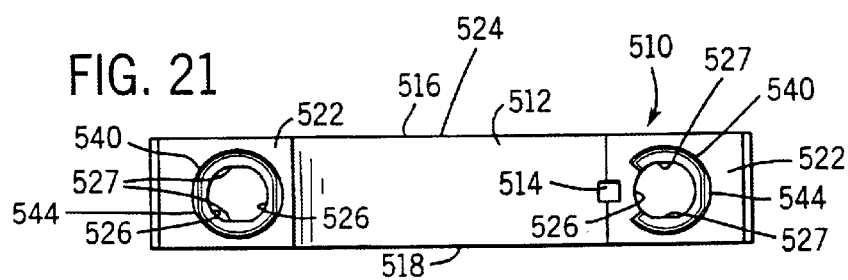

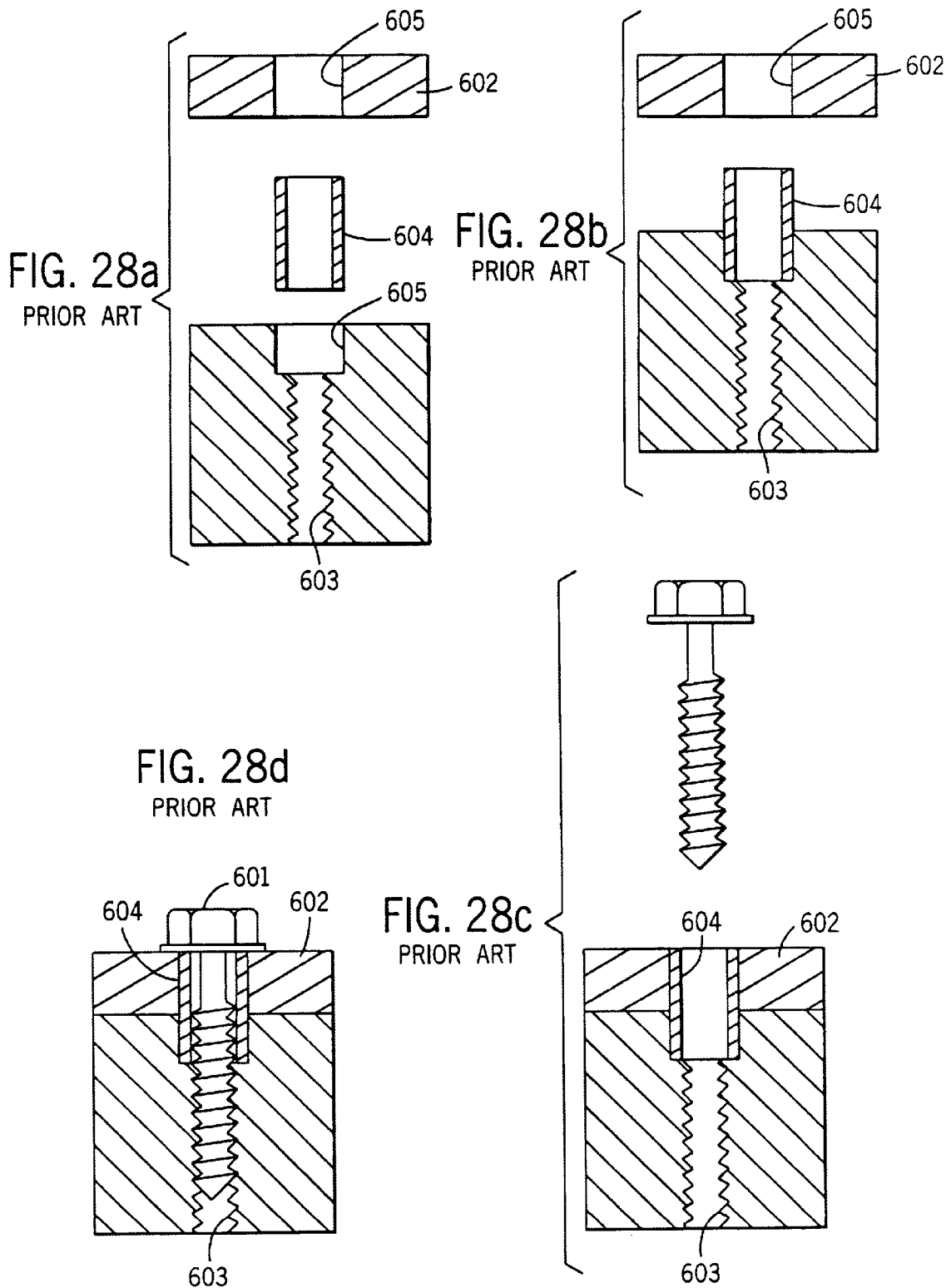

FIG. 32a
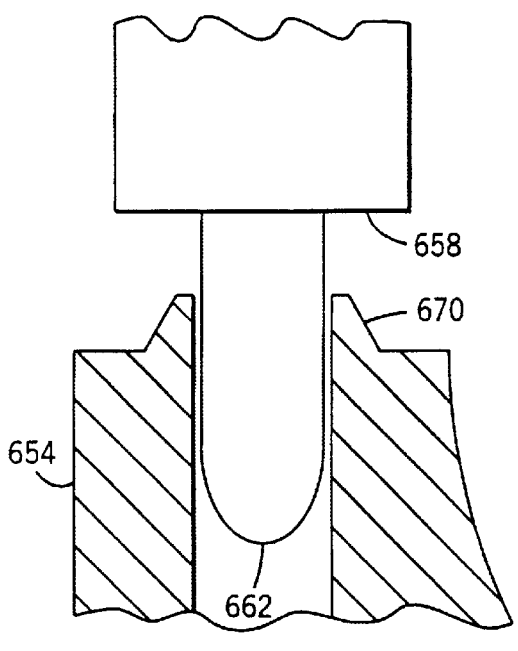
FIG. 32b
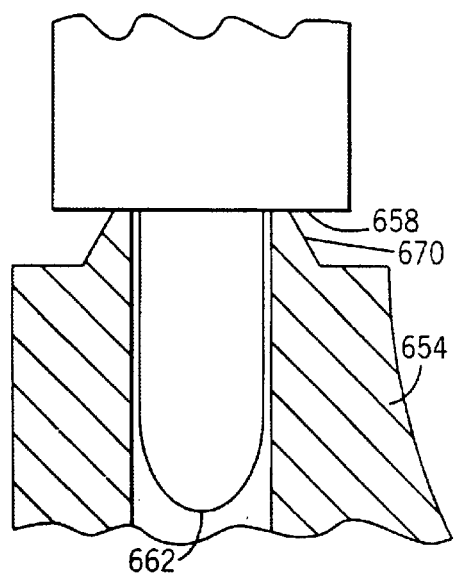
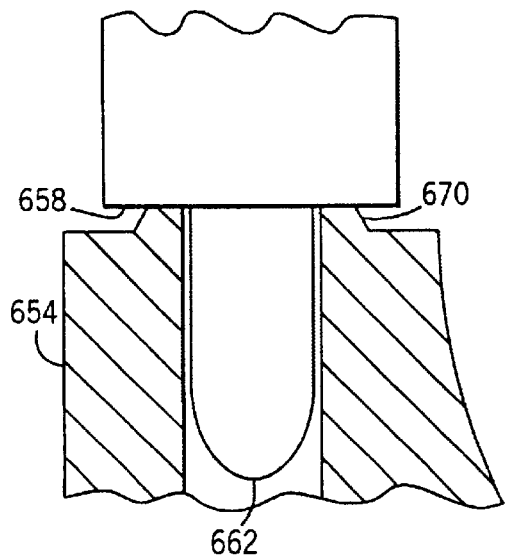
FIG. 32c
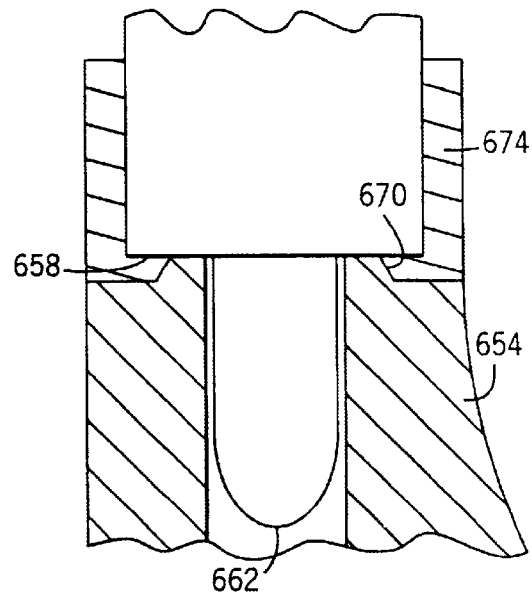
FIG. 32d

PRECISELY REPOSITIONING POWDER METAL COMPONENTS

CROSS REFERENCE TO RELATED APPLICATIONS

This application claims the benefit of U.S. Provisional Patent Application Ser. No. 60/168,245 filed Dec. 1, 1999 and is a continuation in part of U.S. patent application Ser. No. 09/155,781 filed Oct. 2, 1998, which is the national phase in the United States of International Patent Application Serial No. PCT/US97/04050 filed Mar. 12, 1997, which claims the benefit of U.S. Provisional Patent Application Serial No. 60/016,852 filed May 3, 1996.

BACKGROUND OF THE INVENTION

1 Field of the Invention

This invention relates to powder metallurgy, and in particular to the application of powder metallurgy to produce precisely repositionable components.

2. Discussion of the Prior Art

International Patent Publication No. WO 97/42424 published Nov. 13, 1997, which is hereby incorporated by reference, discloses an integral dowel design solution for a problem where there was a specific need for bearing caps to be accurately repositioned after joint separation and reassembly. U.S. patent application Ser. No. 09/155,781 filed Oct. 2, 1998, which issued Jul. 11, 2000 as U.S. Pat. No. 6,086,258, hereby incorporated by reference, is the national phase in the United States of International Patent Application Serial No. PCT/US97/04050 filed Mar. 12, 1997 which was published in the above identified International Publication No. WO 97/42424.

The essential function of a bearing cap is to retain and locate a rotary shaft, or a bearing for a rotary shaft which in turn retains and locates the shaft, relative to a support structure. For example, the main bearing cap of an engine bolts to a bulkhead of the engine crankcase and together with the bulkhead retains and locates the crankshaft journal in place while the crankshaft is rotating. The crankshaft journal runs against two half shell bearings which are fitted to the main bearing cap and the engine bulkhead semi-circular bores, respectively.

In this case, for vibration free, low friction and quiet running, the roundness of the bore produced by the main bearing cap and the bulkhead is very important. This roundness is achieved by a machining operation called line boring. The main bearing caps are bolted to the bulkheads of the engine block, and then a boring bar fitted with a cutting tool is used to machine the bores in the assembly. This ensures the two half rounds formed by the main bearing cap and the bearing block form as near to a perfect circle as possible. A finishing operation involving a grinding hone is often used to achieve the extremely fine tolerances needed for quiet running and efficient engine performance.

However, to install the crankshaft, it is necessary to remove the main bearing caps from the engine block. After the crankshaft is put in place, it is necessary to reposition the main bearing caps to the bulkhead so that they are replaced in the identical position they occupied during the line boring operation. Any deviation from that original position produces an out-of-round condition that, in turn, leads to vibration, noise and possibly stiff, high friction crankshaft operation.

There are a number of conventional structures for re-locating and attaching the main bearing caps to bulkheads when installing the crankshaft. One such structure is shown in FIG. 1. In this instance, the main bearing cap C has a very precisely machined, snap-width W, which is the distance across the long axis of the main bearing cap across the foot sections T of the bearing cap. Similarly, a precision channel P is machined in the engine block bulkhead B to produce a controlled interference fit with the feet T when the main bearing cap C is refitted after crankshaft installation.

This method does not, however, provide relocation in the fore and aft direction (i.e., in the direction of the axis of the journal bore J). The bolt holes H themselves are used to control the axial repositioning, and since there is a substantial clearance between the bolts F and the bolt holes H of the main bearing cap C, this relocation accuracy is generally poor.

In addition, the interference fit between the main bearings caps C and the channel P in the engine block B in this structure is a variable which affects the final roundness of the bore J after re-installation. A highly stressed main bearing cap C may stress relieve during engine operation, thereby changing the roundness of the bore. Also, the precision machining operations required on the main bearing caps C to define the snap width W and on the block B to form the channel P, so as to avoid an overstressed or loose main bearing cap in this structure, are relatively expensive.

Another known method of location and attachment is shown in FIG. 2. This involves the use of hollow dowels D. These dowels D are pressed into counter-based holes L in the engine block bulkhead B. The dowels D then locate in precisely machined counterbores M in the corresponding main bearing cap foot sections T. The accuracy of installation of the hollow dowels D is dependent upon the precision counterboring of the engine block and the main bearing cap. Both of these operations have a finite tolerance which, when stacked up with the tolerance on the dowel D outer diameter, can produce an unacceptable variation in location of the main bearing cap C. Additionally, this procedure has the added expense of purchasing precision hollow dowels, their handling and installation, and the costly machining of precision bores L in the bulkhead B and M in the main bearing caps C.

In many cases where hollow dowels as shown in FIG. 2 are used, the engine block channel/main bearing cap snap width relocation method of FIG. 1 is also used. This combination is expensive and, in fact, can produce a situation where the interference fits between the snap-width and channel are in conflict with the interference fits between the hollow dowels and the main bearing cap or bulkhead holes.

It has also become clear that there are many other applications that would benefit from an integral dowel design. One example concerns the need for precise angular location of a toothed sensor ring that measures the timing of an internal combustion engine. FIGS. 27 and 28 show drawings of a portion of the sensor ring and the flywheel or other component to which it is assembled. The previous design of FIGS. 27 and 28 used bolts 601 with a conical head shape that locates into a similar cone shape in a ring 602. This suffers from the problem of using the threaded hole 603 to provide angular location. As stated above, it is well known in the engineering profession that using a threaded hole to both fix and precisely locate two components is not good practice. The reasons are that it is difficult to thread a hole concentrically, and even harder to ensure that the bolt is concentric to the threads.

This stack-up of errors reduces the precision of the fixture to the point where a separate locating dowel 604 is often needed, as illustrated in FIGS. 28a–d, similar to the separate dowel of FIG. 2. As stated above, the two components must be precisely oriented and clamped, then a precision hole 605 must be bored through one component into the second one. Finally, a separate dowel 604 must be pushed through both holes 605 to achieve the desired location precision. This is expensive both in cost of machining and the purchase of the dowel 604.

SUMMARY OF THE INVENTION

The present invention provides a structure and method of permitting precise repositioning of two components relative to one another where one of the components is made by powder metallurgy (P/M). The P/M component has an integral boss protruding from it, which is received in a bore of the part to which the component is assembled. The boss is of a shape and ductility so that at least one of the boss and bore plastically conform to one another when they are brought together with force, for example in a pressing operation or when they are bolted together for the first time. The plastic deformation of the boss and bore creates a unique mating surface fit between the two parts so that when the two parts are taken apart and then put back together, they go back together in the exact same, or near to the exact same, position.

In a preferred form, the boss is provided around a bolt hole in the P/M component, and the boss fits into a counterbore of a bolt hole in the part to which the P/M component is assembled. Counterboring bolt holes is a standard process in manufacturing and so the invention is readily adapted to be used without major production line changes.

The boss is preferably tapered, so as to progressively tighten in the bore as it is forced in. A lead-in radius maybe provided on a leading edge of the boss to help initially locate the boss in the bore. Axial splines may be provided on the outside of the boss to further contribute to unique plastic deformation between the boss and bore, with the splines and boss conforming to the bore if the bore is in a relatively hard material such as cast iron, or bite into the bore if the bore is in a relatively soft material such as an aluminum alloy.

Plastic conformance between the bore and the boss is facilitated by the boss and remainder of the bearing cap being sintered powder metal, which is not fully dense. However, it may also need to be ductile, depending on the material of the bore, and if so it is preferably a liquid phase sintering powder metal material. Such a material preferably is a powder metal alloy of iron containing phosphorus from ferrophosphorus powder with a phosphorus content of 0.4 to 0.7% and a carbon content of 0 to 0.8%. Additional strength may be achieved with the addition of copper in the amount of 0 to 4% without loss of ductility.

In another preferred aspect, a moat is formed around a trailing end of the boss. The moat creates a void into which material around the bore may bulge or expand when it is deformed by the insertion of the boss.

In another aspect, the boss may be oblong in one direction, so as to provide an interference fit with the bore in that direction. Other means may be provided to accurately position the components in the other direction.

These aspects may be applied to any of a number of different components. Component applications specifically described are main bearing cap, timing sensor ring and connecting rod bearing cap applications, but the invention is not limited to only these applications.

In another aspect of the invention, a deformable boss can be formed on a powder metal insert for casting which acts as a crush ring to seal molten casting metal from flowing into a hole or crevice which the boss surrounds. The insert is placed in the casting mold, and when the mold halves come together, the bosses are crushed so as to form the seal.

In a method of the invention, two parts, one of which is sintered powder metal, are brought together with enough force to cause plastic conformance between the boss of the P/M part and the hole into which it is inserted. The parts are taken apart and, when reassembled, go back together to replicate the original assembled position.

Other objects and advantages of the invention will be apparent from the detailed description and drawings.

BRIEF DESCRIPTION OF THE DRAWINGS

FIG. 18 is a view similar to FIG. 5 but of another alternate embodiment of a foot for a bearing cap of the invention;

FIG. 19 is a bottom plan view of the foot of FIG. 18;

FIG. 20 is a side elevation view of another alternate embodiment of a bearing cap of the invention, similar to FIG. 3;

FIG. 21 is a bottom plan view of the bearing cap of FIG. 20;

FIGS. 28a–d are cross-sectional views of a prior art method of fastening and locating two components relative to one another using a separate dowel fitted in holes bored in both components;

FIGS. 31a–4 are cross-sectional views illustrating an application of the present invention to securing and locating a die casting mold insert in a die casting mold; and FIGS. 32a–d are detail views illustrating how an integrally formed crush ring of the insert of FIG. 31 is crushed to seal off the bolt hole from the flow of casting metal.

DETAILED DESCRIPTION OF THE PREFERRED EMBODIMENTS

Figure 2:
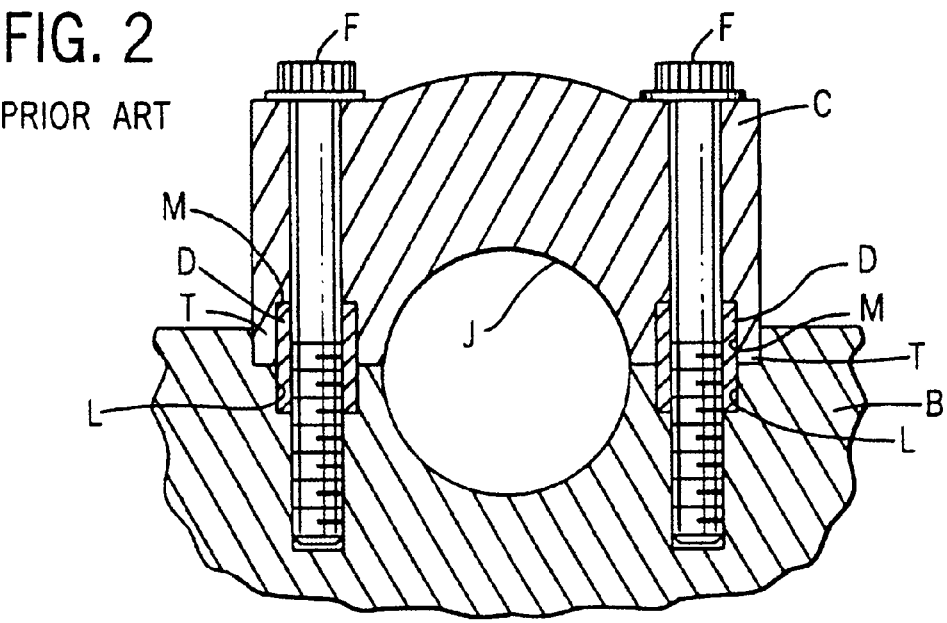
FIG. 2 is a cross-sectional view of another prior art main bearing cap secured to an engine bulkhead.
Figure 3:
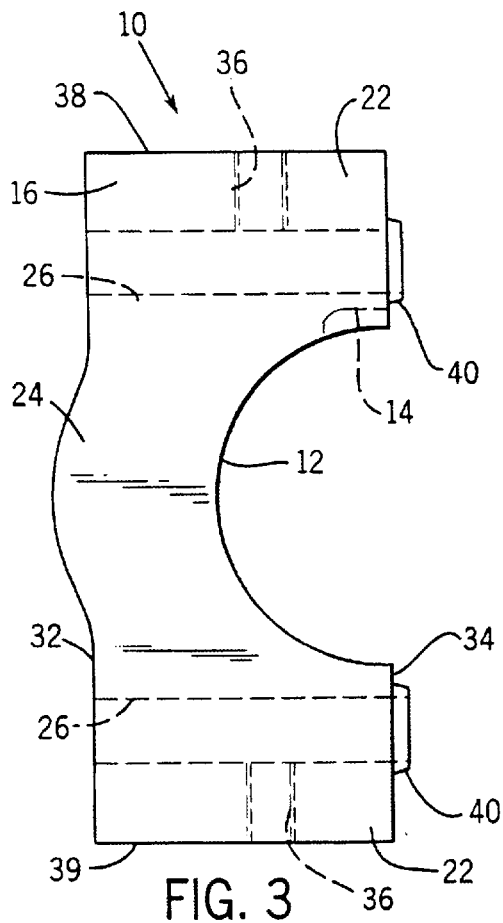
FIG. 3 is a side elevation view of a main bearing cap incorporating the invention.
Figure 4:
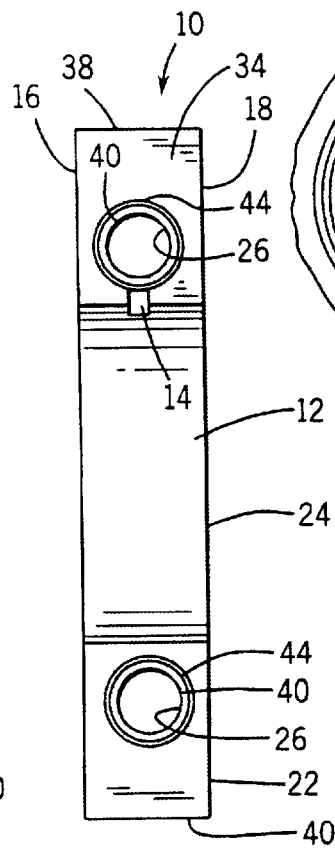
FIG. 4 is a bottom plan view of the main bearing cap of FIG. 3.

FIGS. 3 and 4 illustrate a main bearing cap 10 of the invention. The cap 10 defines a semicircular bore 12 which together with the semicircular bore of the engine bulkhead (see, for example, FIG. 2) defines the bore J (FIG. 2) through which the crankshaft of the engine extends and is journaled. Journal bearings may be received in the bore between the surface of tie crankshaft and the surface of the bore J, as is well known. Cap 10 may be notched as at 14 to receive an ear of the journal bearings so as to prevent the journal bearings from rotating relative to the cap 10 and bulkhead B. The semicircular bore 12 extends through the bearing cap 10 from the front side 16 to the rear side 18.

The bore 12 defines on each of its lateral sides a foot portion 22 of the cap 10. A bridge portion 24 joins the two foot portions 22. A bolt hole 26 extends through each foot portion 22 from the top side 32 to the bottom 34 of the cap 10. The cap 10 may also be provided with threaded set screw holes 36 extending from the lateral sides 38 and 39 at right angles into the respective bolt holes 26 so as to lock the retaining bolts (F in FIG. 2) in position after the cap 10 is bolted to the engine bulkhead (B in FIG. 2) support structure.

Figure 6:
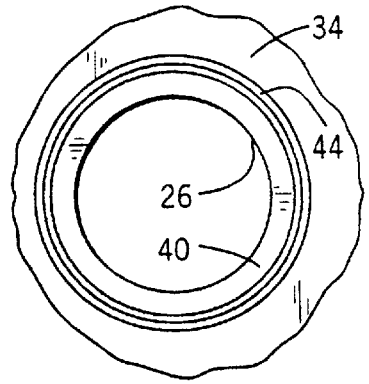
FIG. 6 is a fragmentary bottom plan view of the foot of FIG. 5.
Figure 5:
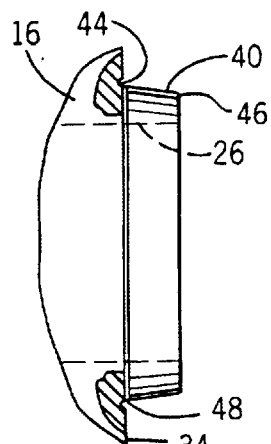
FIG. 5 is a fragmentary detail side elevation view of a foot of the main bearing cap of FIGS. 3 and 4.

Projecting from the bottom side 34 of each foot 22 around the respective bolt hole 26 is a boss 40. Each bolt hole 26 extends through its corresponding boss 40. FIGS. 5 and 6 show in detail the structure of the boss 40. The two bosses 40 are identical, so only one will be described in detail.

The boss 40 extends for 360° around the bolt hole 26 and is itself surrounded by a recess or moat 44 which is formed in the bottom surface 34 of the foot 22 for the purpose described below.

The bolt hole 26 extends into the engine bulkhead B where it is threaded so that bolts F, as shown in FIG. 2, may be used to secure the cap 10 to the bulkhead B. The bulkhead bolt holes are also counterbored, as shown at L in FIG. 2, so as to receive the bosses 40 in the counterbores of the bulkhead. However, the counterbores L of the bulkhead need not be as precise in diameter or position as was necessary when using the precision hollow dowels D as shown in FIG. 2, because the boss 40 is tapered and the boss 40 and counterbore L are conformable to one another.

To effect perfect mating of the parts during line boring and subsequently thereafter when the crankshaft is installed, the main bearing cap 10 is made by sintered powder metallurgy, with the bosses 40 molded integrally with the feet 22 and remainder of the bearing cap 10. As shown in FIGS. 5 and 6, the boss 40 tapers from a minor diameter at its leading edge 46 to a larger, major diameter at its trailing edge 48. The minor diameter is chosen to be less than the diameter of the counterbore L in the bulkhead B, and the major diameter is chosen to be equal to or slightly greater than the diameter of the counterbore L. This tapering of the boss 40 ensures that the main bearing cap 10 is in the identical position after crankshaft installation as it was when it was line bored. The angle of the taper is preferably greater than 7° so as to ensure easy removal of the bearing cap 10 from the bulkhead after line boring.

Figure 7:
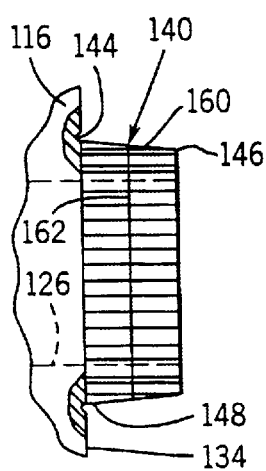
FIG. 7 is a view similar to FIG. 5 but of an alternate embodiment.
Figure 8:
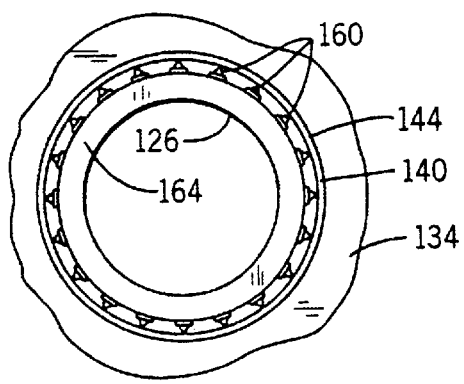
FIG. 8 is a bottom plan view of the foot of FIG. 7.
Figure 9:
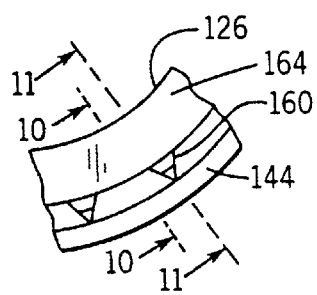
FIG. 9 is an enlarged fragmentary detail bottom plan view of the foot of FIG. 8.
Figure 12:
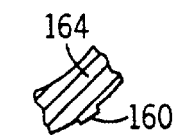
FIG. 12 is a partial cross-sectional view as viewed from the plane of the line 12—12 of FIG. 11.

An alternate embodiment of the boss 40, designated 140, is shown in FIGS. 7 and 8, with details shown in FIGS. 9–13. The boss 140 is identical to the boss 40, except as shown and described below. The boss 140 shown in FIGS. 7 and 8 has linear splines 160 angularly spaced apart all the way around its circumference. Leading edge 146 of the boss 140 defines the minor diameter of the boss 140, which is less than the diameter of the counterbore in the bulkhead into which the boss 140 fits, and the boss 140 tapers to its major diameter at its trailing edge 148, which is somewhat greater than the counterbore diameter into which the boss fits.

As shown in FIGS. 9–13, the linear splines 160 are flat from leading edge 146 to line 162, which is at approximately the axial midpoint of the boss 140, and are pointed and continue to taper outwardly at a more shallow angle from the midpoint 162 to the trailing edge 148. The underlying tubular body 164 of the boss 140 may also taper from leading edge 146 to midpoint 162 and may at that point become constant in diameter to the trailing edge 148 so as to provide adequate support to the splines 160.

FIGS. 14–19 show other alternate embodiments of the invention. Elements corresponding to elements of the boss 140 are labeled with the same reference numeral plus 100 for FIGS. 14 and 15, plus 200 for FIGS. 16 and 17 and plus 300 for FIGS. 18 and 19.

Figure 14:
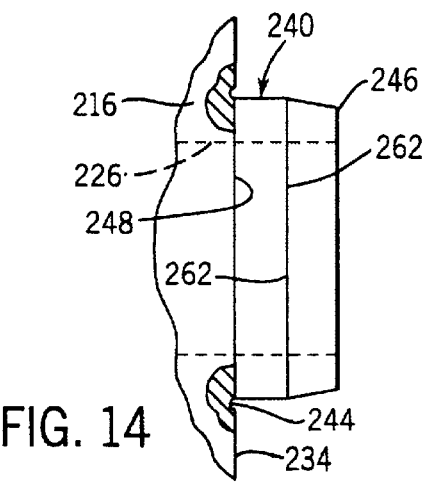
FIG. 14 is a view similar to FIG. 5 but of another alternate embodiment of a foot for a bearing cap of the invention.
Figure 15:
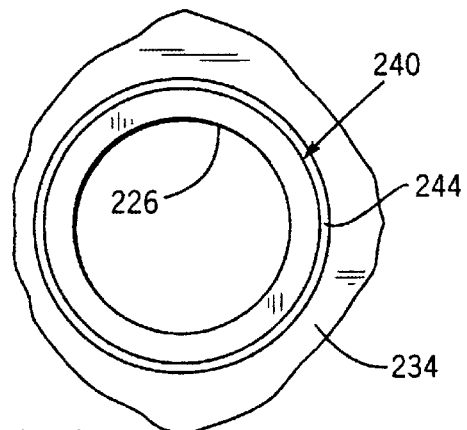
FIG. 15 is a bottom plan view of the foot of FIG. 14.
Figure 16:
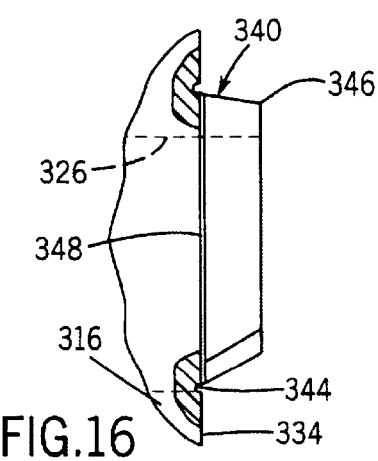
FIG. 16 is a view similar to FIG. 5 but of another alternate embodiment of a foot for a bearing cap of the invention.
Figure 17:
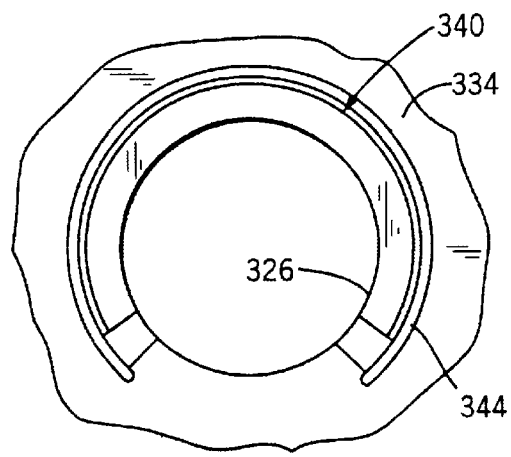
FIG. 17 is a bottom plan view of the foot of FIG. 16.
Figure 22:
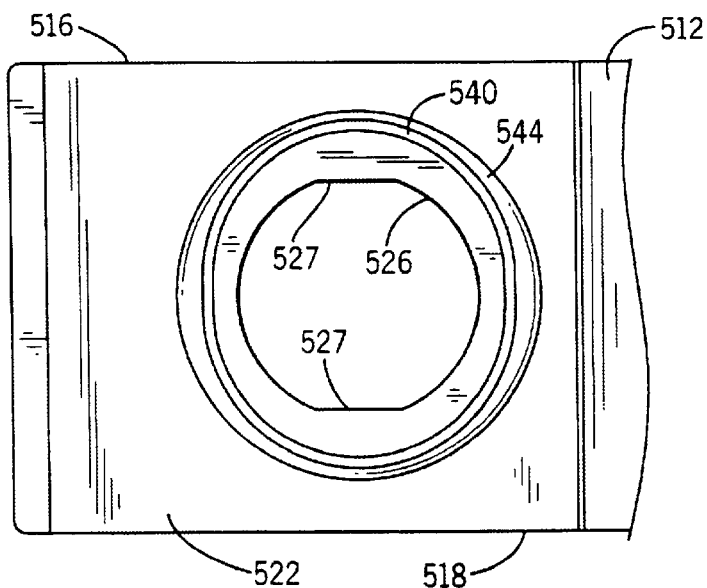
FIG. 22 is a detail bottom plan view of the left foot shown in FIGS. 20 and 21.
Figure 23:
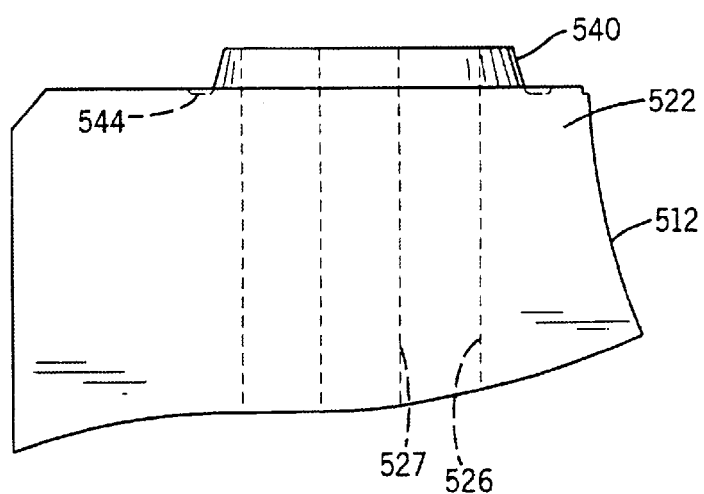
FIG. 23 is a detail side elevation view of the foot shown in FIG. 22.

The boss 240 shown in FIGS. 14 and 15 is identical to the boss 140, except that it is not provided with axially running linear splines 160. The boss 340 shown in FIGS. 16 and 17 is identical to the boss 40 of FIGS. 3–6, except that it does not extend for 360° around the bolt hole 26. The moat 344 is also coterminous with the trailing edge 348 of the boss 340. The boss 440 is the same as the boss 40, except that it is provided with ribs or axially running linear splines 460 which are flat from their leading edges to their trailing edges.

The exact design of the boss used for practicing the invention will depend upon the application. There must be sufficient conformance between the bosses 40 and the counterbores L of the supporting structure so as to precisely locate the bearing cap 10 relative to the support structure. If additional conformance is needed, a design utilizing the linear splines such as 160 or 460 may be used. The combination of these linear splines and the fact that the sintered powder metal is not fully dense, results in the needed conformance between the boss and the corresponding bulkhead counterbore.

Where the bulkhead material is an aluminum alloy, for example, the linear splines bite into the softer counterbore to make a perfect fit. Any bulging of the aluminum is accommodated by the moat 44, 144, 244, 344, or 444. In the case of a cast iron bulkhead, which is relatively hard and nonconforming, the splines can condense and conform to the cast iron counterbore, and, again, form a perfect fit.

FIGS. 20–23 illustrate another alternate embodiment of a bearing cap of the invention. Elements corresponding to elements of the boss 140 are labeled with the same reference numeral plus 400.

The boss 540 is tie same as tie boss 140, except that it is oblong (which includes oval), having its longer dimension in the direction of the crankshaft which is retained by the bearing cap, i.e., in the axial direction of the bore 412. The result is that the bosses 540 engage their round engine block bulkhead counterbores in such a way as to prevent relative motion in the axial direction but provide a clearance in the lateral direction, which is the direction that the snap width (between surfaces 438 and 439) provides for location. Thereby, by the oblong bosses 540 providing an interference fit in the axial direction and the snap width providing an interference fit in the lateral direction, the bearing cap 410 is accurately located in all directions.

Since the boss 540 is oblong, the recess or moat 544, which has a round outer periphery, varies in width as illustrated. The hole 526 is a truncated round shape, having its round shape truncated by laterally extending flats which are spaced far enough apart in the axial direction to permit passage of the bolt F for securing the cap 510. This shape allows substantial clearance with the bolts in the lateral direction.

In FIGS. 20 and 21, a 360° boss 540 is shown on the left side and a boss 540 is shown on the right which extends for less than 360°, extending for approximately 270° with its inward most quadrant absent. The moat 544 of the right boss 540 is also truncated. It should be understood that the bosses can be different as shown, or can be the same, with both being 360° or 270° bosses.

The precise installation of the main bearing cap 10, 110, 210, 310, 410 or 510 with any of the bosses described above can be achieved by tightening the retaining bolts F alone, or alternatively, by applying independent pressure to the assembly, for example, from a hydraulic ram. After line boring, the bearing cap is readily removed due to the tapered geometry of the installation interface. After installing the crankshaft, the bearing caps are replaced, and the integral bosses nest into their preformed positions (preformed when the cap was initially mounted to the support structure prior to line boring) with great accuracy.

Figure 10:
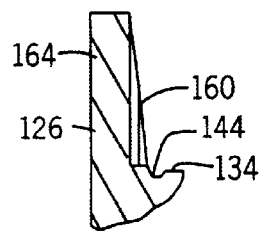
FIG. 10 is a partial cross-sectional view as viewed from the plane of the line 10—10 of FIG. 9.
Figure 11:
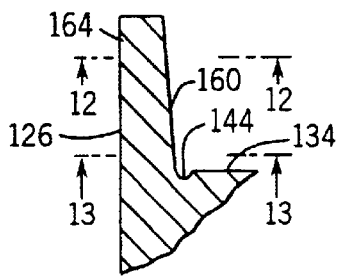
FIG. 11 is a partial cross-sectional view as viewed from the plane of the line 11—11 of FIG. 9.
Figure 13:
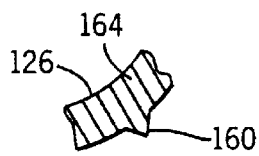
FIG. 13 is a partial cross-sectional view as viewed from the plane of the line 13—13 of FIG. 11.

As stated above, the particular design of the boss will depend on the application. The principal variables in the design are the taper angle, the length of the boss, the relative lengths of the tapered and straight portions of the boss, the number, width, and radial height of any vertical splines, and the radial wall thickness of the boss. The leading edge of the splines may be tapered at a higher angle as shown in FIG. 10 or may have a small lead-in radius as shown in FIG. 18 to aid in initial location of the bearing cap bosses into the bulkhead counterbores. The particular design of a bearing cap incorporating the invention will depend upon various specific design details of the bulkhead, such as whether a bearing notch is needed in the cap, wall thicknesses needed between the bolt hole and the side of the bearing cap, the material of the bulkhead, and the design of the bulkhead counterbore hole, for example, with respect to lead-in chamfers or even a preformed taper. In all cases, however, it is essential that the sintered powder metal bearing cap boss produce a mating surface to ensure identical relocation after installation of the crankshaft, by plastically conforming to the counterbore, causing the counterbore to plastically conform to the boss, or a combination of both.

As mentioned above, for practicing the invention, the bearing cap must be made sintered powder metal. A desirable quality of the power metal material of the bearing cap for carrying out the invention is ductility. Since the splines, or the body in some cases, will yield plastically to some extent during the initial installation process, it is important to avoid cracking. Most powder metal ferrous materials are inherently brittle. To overcome this potential difficulty, it is preferable to use a material that has an adequate ductility.

There are a number of ways of improving the ductility of sintered powder metal ferrous materials, but most of them are expensive or inapplicable to bearing caps. However, an appropriate liquid phase sintering system is particularly useful in providing the necessary ductility in this application. An example of this process involves the use of a phosphorus compound such as ferrophosphorus. A small amount of ferrophosphorus powder is added to the ferrous material powder during powder blending. After compaction and during the thermal treatment stage (sintering), this small amount of ferrophosphorus becomes molten and dramatically increases the rate of atomic diffusion during the sintering process. This enhanced diffusion produces a rounding of the microporosity in the sintered powder metal component which, in turn, provides increased ductility.

To achieve this, the composition of the powder metal material from which the bearing cap of the invention is made should contain 0.4 to 0.7% phosphorus (preferably 0.4 to 0.6% phosphorus), a carbon content of 0 to 0.8% carbon (preferably 0.4 to 0.6% carbon) and with the balance being essentially iron (neglecting impurities). This material with the preferred percentages can produce a tensile elongation of 3%, which is adequate for straight spline conformance to a cast iron counterbore, and also strong enough to indent a cast aluminum alloy bulkhead. Additional strength can be attained by the addition of 0 to 4% copper in the final mix of the material for making bearing caps of the invention without loss of ductility.

In practicing the invention, it is important to ensure dimensional consistency of the distance between the axial centers of the bosses. It is relatively inexpensive to control the counterbore L diameter hole centers in the engine block bulklhead by the use of appropriate drill guides or computer controlled drill heads. However, to control the distance between the boss centers of bearing caps of the invention requires some form of dimensional control during or after the sintering operation. One example of an appropriate procedure is to repress the bearing cap in a set of tools which will straighten and adjust the dimensions of the component. This is a procedure well known in the powder metallurgy industry as repressing (also known as sizing or coining). An alternative approach is to use a fixture which locates and retains the bearing cap holes in position during sintering. Such a fixture could be made from either stainless steel or molybdenum and may consist of a U-shaped staple like structure, the legs of which are inserted into the bolt holes of the main bearing cap, thereby avoiding distortion during the sintering operation.

A common problem encountered in main bearing cap joints is "fretting". This is the relative micromovement of the clamped contact surfaces of the bearing cap and bulkhead at high frequency that results in damage to the surfaces. Fretting fatigue is a possible outcome of this mechanism.

Figure 1:
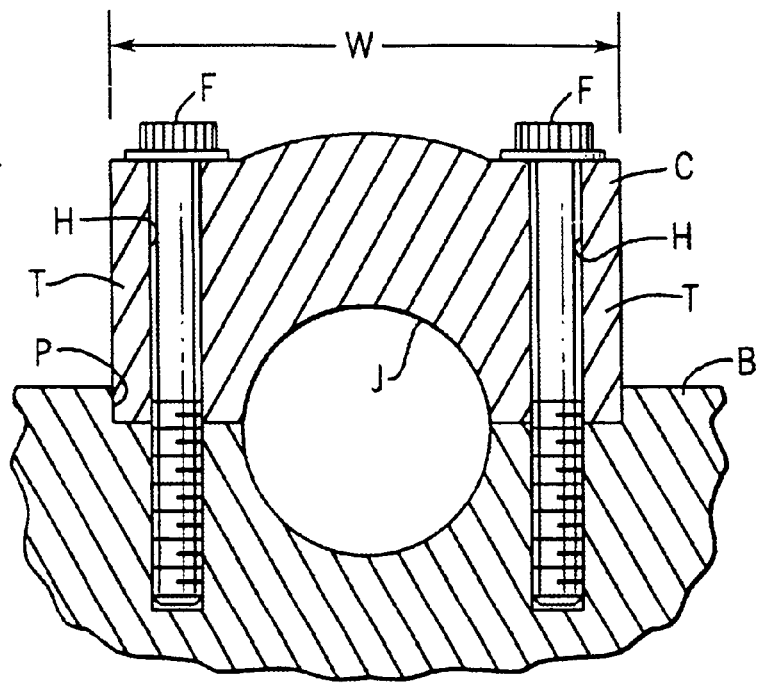
FIG. 1 is a cross-sectional view of a prior art main bearing cap secured to an engine bulkhead.
Figure 24:
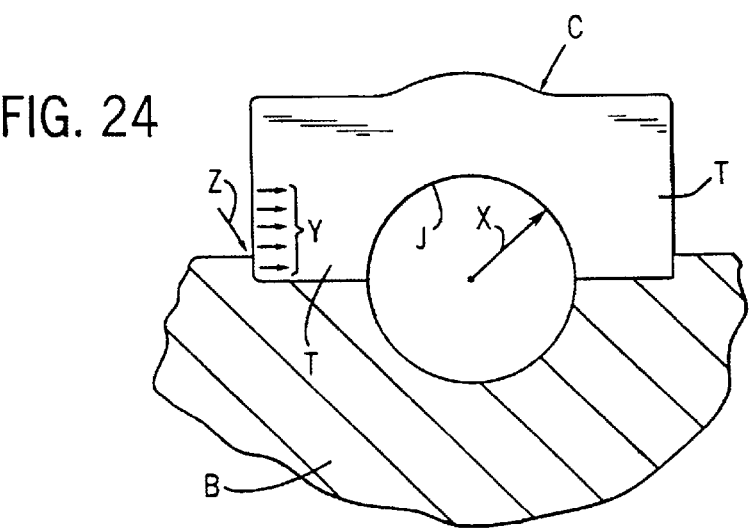
FIG. 24 is a view of how a bearing cap can be loaded in operation.

When a main bearing cap is constrained laterally in the block by a snap width channel as shown in FIG. 1, it can still move fore and aft (axially) and also from side to side (laterally) under load. Fore and aft motion is due to crankshaft bending (especially in V-engines) which causes a rocking motion. Since there is no restraint in this direction other than bolt clamp pressure, microsliding, and therefore fretting, can occur. Similarly, as illustrated in FIG. 24, when the crankshaft loading X is pushing the cap to the "right", the left foot is pulled away from the snap channel as indicated by arrows Y to create a clearance at the area indicated by the arrow Z.

The present inventions which provides an integral hollow dowel on the bearing cap foot, improves this situation since the dowel serves to fix the position of the foot relative to the block. The fretting problem can be further mitigated by hollowing out the footprint of the bearing cap, which has the effect of raising the clamping pressure for a given bolt loading. By appropriate geometry, the remaining metal forms a land that increases the quality of clamping close to the bearing shell.

Figure 25:
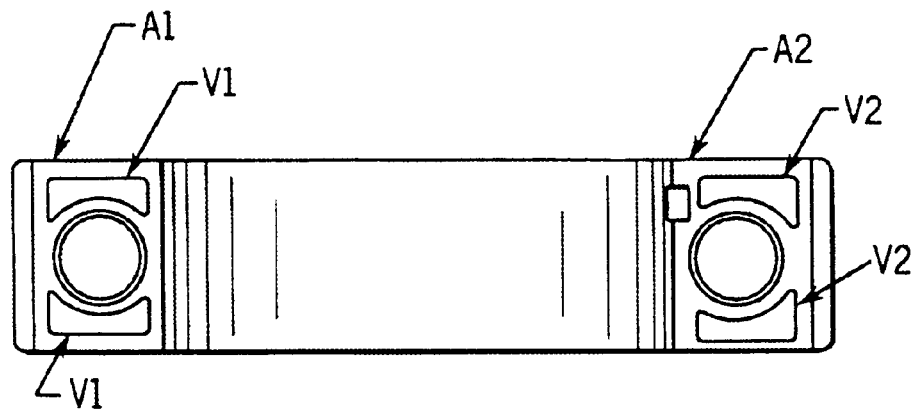
FIG. 25 is a bottom plan view of another alternate embodiment of a bearing cap of the invention.
Figure 26:
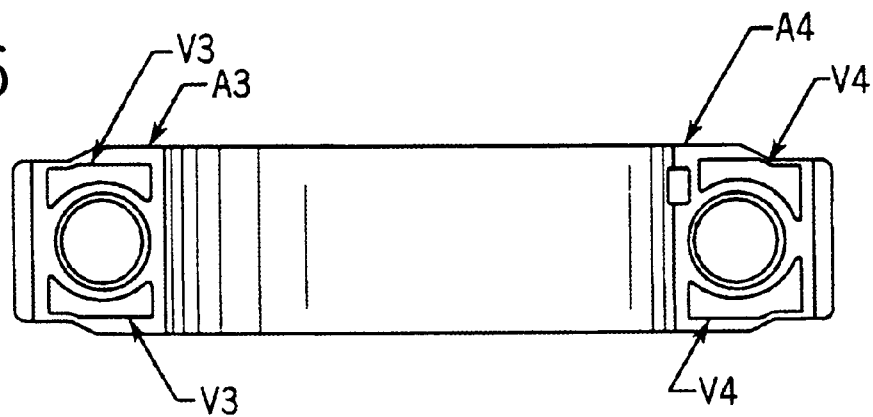
FIG. 26 is a bottom plan view of another alternate embodiment of the invention.
Figure 27A:
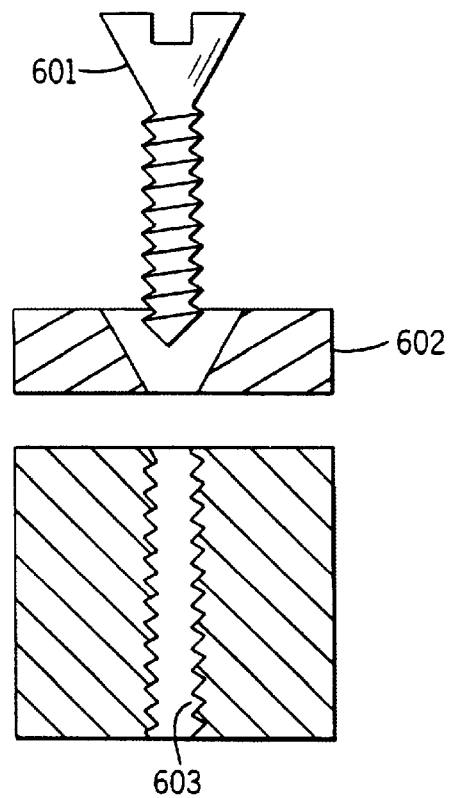
FIGS. 27a and 27b are cross-sectional views of a prior art method of fastening and locating two components relative to one another using a threaded bore in one of the components, a conical counterbore in the other component and a conical headed threaded fastener.
Figure 27B:
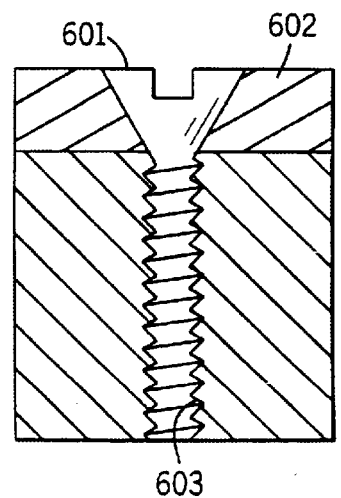

The technique of reducing area to raise clamping pressure is not new. However, it is very costly to achieve in volume production. The current predominant process of making bearing caps is by casting and machining. To machine precision hollow forms in a casting is prohibitively expensive. Using powder metallurgy, however, hollows can be molded into the foot with great precision for no extra cost beyond the initial tooling face form costs. Examples of four suitable forms for producing the indicated void areas V1–V4 (approximately 0.010–0.020 inches deep) and corresponding planar contact areas A1–A4 are shown in FIGS. 25 and 26. These voids may be used either with or without integral bosses as described above and maybe used in any combination. Experimentation with pressure sensitive paper and finite element analysis simulation shows that the hollowed out foot surface raises the clamping pressure by the following percentages (the void area given is for each void and there are two voids per foot as illustrated):

| | Clamping Load | |
|---|---|---|
| Contact Area (in²) | Void Area (in²) | Increase |
| A1 = 1.0957 | V1 = .2942 | 32% |
| A2 = 1.1373 | V2 = .2936 | 33% |
| A3 = 1.0191 | V3 = .2936 | 30% |
| A4 = 1.0504 | V4 = .3159 | 33% |

Figure 29A:
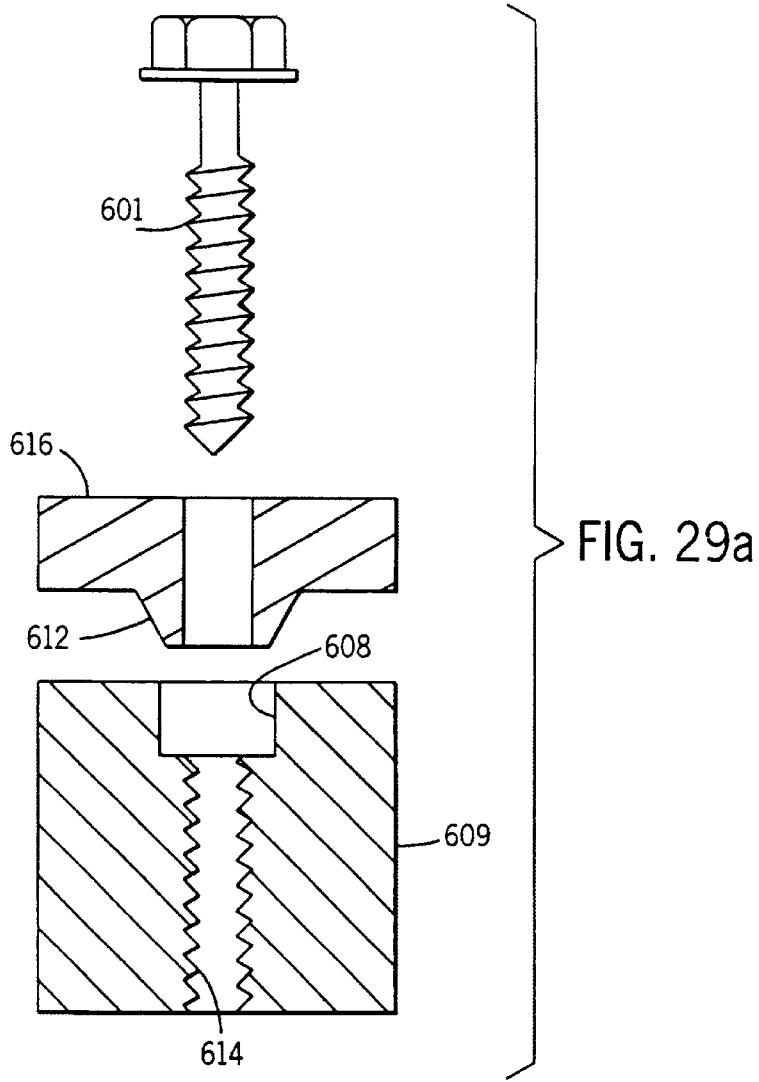
FIGS. 29a and 29b are cross-sectional views, similar to FIGS. 27 and 28, but illustrating an application of the present invention to joining and locating the two components relative to one another.
Figure 29B:
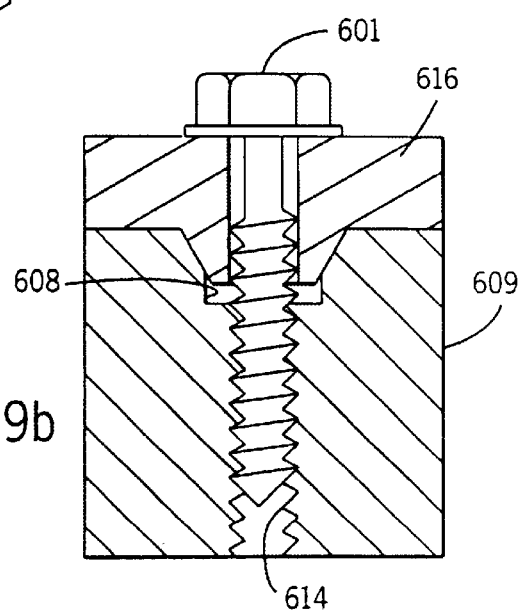

The previously described structures, materials and methods as applied to a bearing cap can also be applied to other powder metal components. Thus, the present invention avoids the problems of the prior art in locating two components of any suitable type fastened by a bolt 601 (FIG. 29*a–b*) by using a precision drilled counterbore 608 in one of the components 609 in combination with an integral dowel 612 made by powder metallurgy. The counterbore 608 may be provided around a hole 614 in the component 609, which may be tapped, as shown in FIGS. 29*a* and 29*b*. The counterbore 608 is easily provided by commonly available computer numerically controlled (CNC) machining units. The integral dowel 612 formed on the mating component 616 engages the counterbore 608 and is self-centering on account of the tapered or conical shape of the integral dowel 612 fitting into and interfering with the counterbore 608. The bolt 601 pulls the tapered lead angle of the conical outer surface of the integral dowel 612 into the counterbore 608 to give precise angular location. Plastic deformation of the dowel 612 and/or counterbore 608 may occur, and may be preferred in some applications, since such deformation contributes to precise relocation. Another advantage of this application is that it avoids the need for special conical-head bolts, and can use low cost regular headed bolts.

Figure 30A:
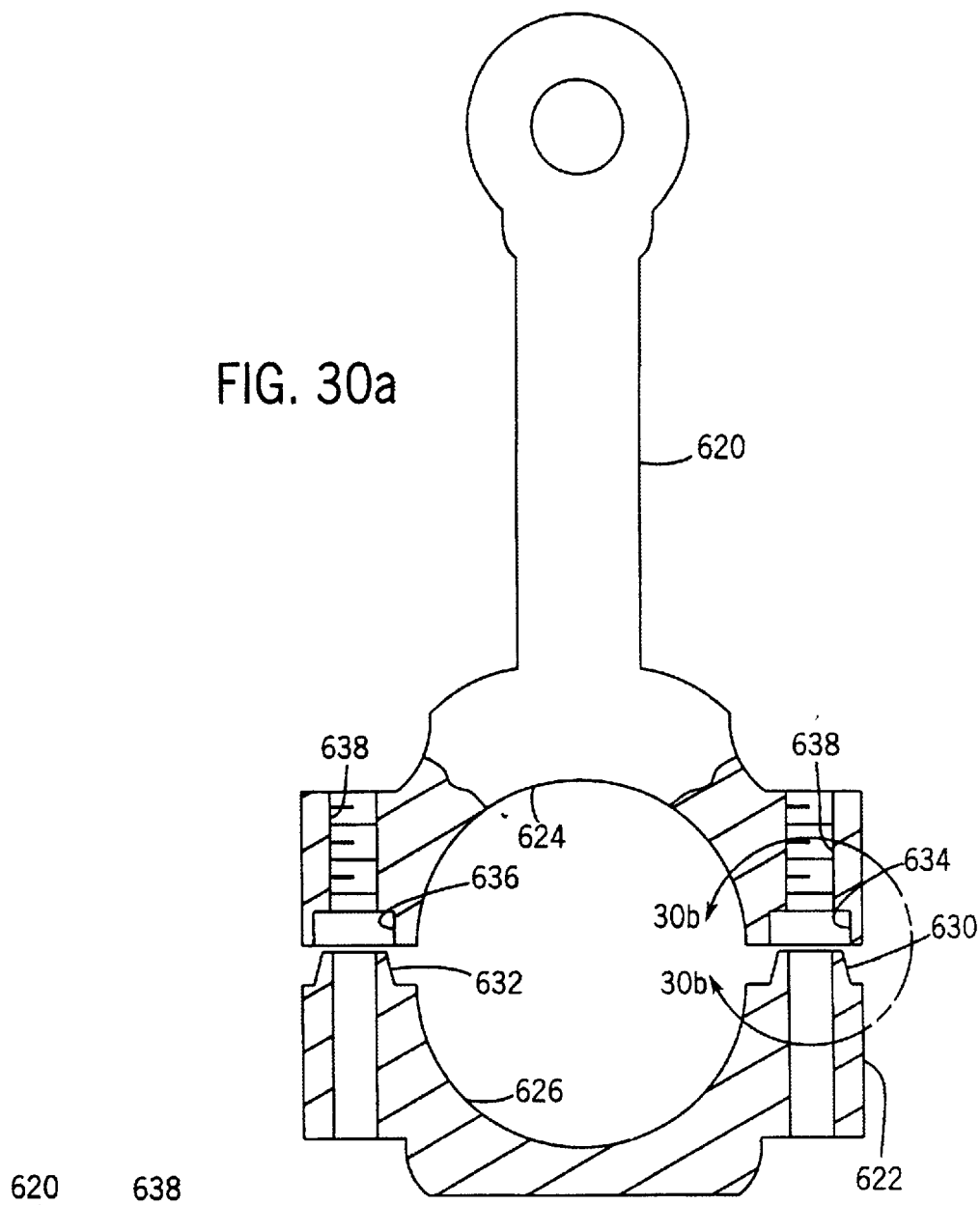
FIGS. 30a and 30b are cross-sectional views illustrating an application of the present invention to securing and locating a bearing cap relative to a connecting rod.
Figure 30B:
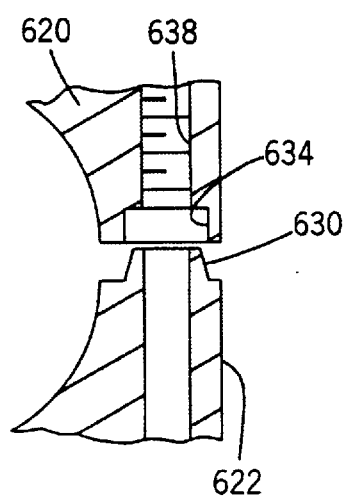

Another example of the application of this invention is a reciprocating engine connecting rod 620 and bearing cap 622 as shown in FIGS. 30*a* and 30*b*. In this case, the cap 622 has to be connected to the rod 620 prior to machining the bore 624, 626 in which the crankshaft is journaled so that when the piston pin of the crankshaft (not shown) is inserted in the bore 624, 626 after machining, it locates in the correct location. This ensures excellent roundness and quiet running of the engine piston. Current solutions include a method where the cap is fractured away from the rod, so that the fracture is used to precisely reassemble the rod and cap. This is fine for essentially brittle materials, but is inappropriate for the stronger, tougher materials used for highly stressed engines, since instead of cracking, they tend to bend and deform. In such cases, the current invention is an economical solution. The cap 622 is molded with two integral dowels 630, 632 having outer conical surfaces that fit into and interfere with counterbores 634, 636 formed around the drilled and threaded holes 638 in the rod 620. Again, this invention separates locating and fixturing, which avoids the bolts bearing against the sides of the bolt holes, which can introduce distortion and stresses that can lead to engine failure.

Another application of the invention is to locate a powder metal component in a die cavity that will be filled with molten metal—especially aluminum. Often, it is necessary to reinforce an aluminum casting with a powder metal (P/M) steel insert. For example, such an application may include a main bearing insert in the lower half of an aluminum alloy combustion engine cylinder block or a bed plate. In such a case, the lower thermal expansion of the steel of the insert compared to the aluminum alloy of the crankcase is used to maintain bore-roundness when the engine temperature rises during running and the aluminum tries to grow away from the crankshaft, leaving a gap that can cause engine noise.

It is difficult to accurately position the insert within the die cast mold since the mold is open at insertion and closed during casting. The integral dowels solve this problem by both locating the bearing cap during mode closure and sealing off the bolt holes from molten aluminum.

Figure 31A:
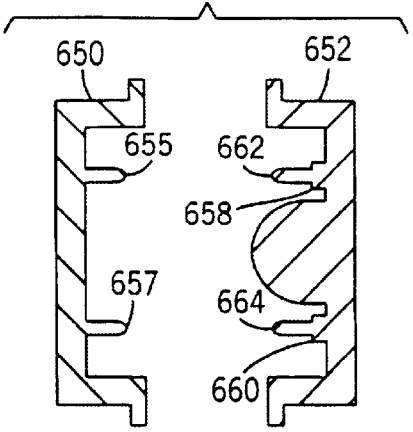
Figure 31B:
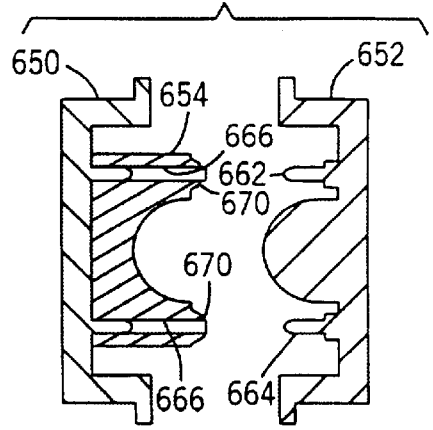
Figure 31C:
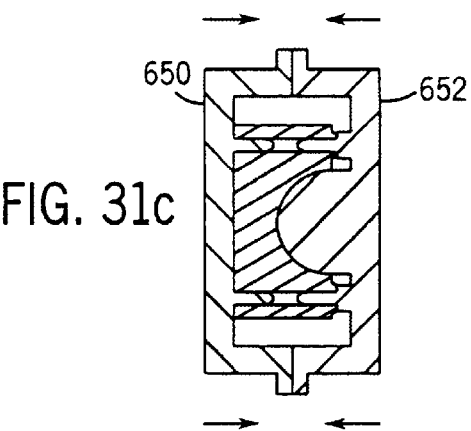
Figure 31D:
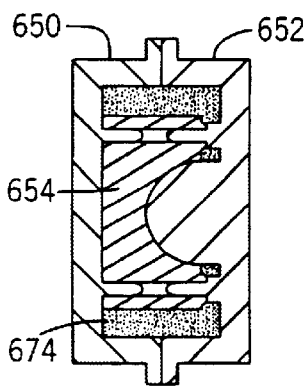
Figure 31E:
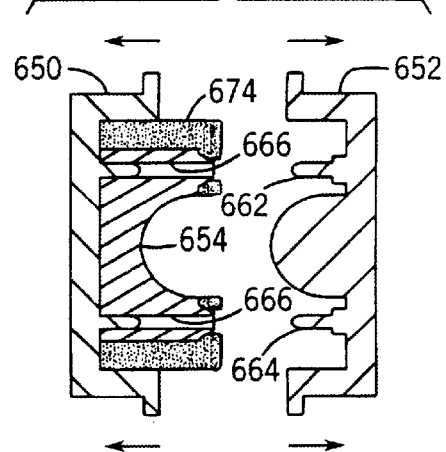

FIG. 31*a* shows the open die halves 650, 652 and FIG. 31*b* show it with a main bearing cap insert 654 impaled on two bullet-nosed pins 655, 657 that hold it in position on the left half 650 of the die, while the opposite right side 652 of the die advances as the mold is closed (FIG. 31*c*). The right die wall has two shouldered bullet nosed pins 662, 664, one of which is shown in detail in FIGS. 32*a–d,* that locate into the open ends of the holes 666 in the bearing cap insert 654, when the mold is almost closed, as shown in FIGS. 32*a–d.* The die mold halves 650, 652 are finally clamped closed under a very high load, sufficient to crush the integral dowels and bring the mold halves together with sufficient force so as to prevent high pressure molten aluminum 674 from spurting out from the mold joint line. The shoulders 658, 660 on the right hand set of pins 662, 664 crush the integral cone-shaped dowels 670 to create a seal between the pins and the holes 666. The seal prevents the molten aluminum 674 from entering the holes 666. This action causes precise location of the cap 654 and eliminates the need for expensive drilling-out of aluminum flash that otherwise enters the bolt holes 666 where it solidifies. After solidification of the aluminum, the mold is opened as shown in FIG. 31*e,* and the composite part is ejected.

The height of the integral dowel 670 (or crush ring) is chosen to accommodate normal variation in mold closing distance and to produce adequate resistance to provide a sealing pressure that prevents aluminum penetration. It is the intrinsic microporous nature of sintered powder metal that enables the material to behave in this way to effect a crush ring seal. The traditional gray cast iron that is often used for main bearing caps is very brittle and would crack and fragment under the crushing load. Ductile cast iron which is also used, would be more likely to deform without cracking, but the cost to machine the integral dowel shapes around the bolt holes would be prohibitive.

Experimental integral-dowel in-casting trials with a test mold in a high pressure die cast machine enabled the crush ring dimensions to be optimized. Subsequently these findings were confirmed in a casting trial that involved substituting P/M steel caps in a current production bed plate that contained five ductile cast iron bearing cap inserts. The tests showed that a dowel height of 0.04 inches (2 mm) with a 0.02 inches (0.5 mm) flat sealing face radial thickness and an angle of 45 degrees (90 degrees included cone angle) worked well in locating the in-cast insert. This also gave 100% sealing against aluminum ingress of all the bolt holes in a trial of 100 holes, compared to at least 70% of holes in the cast iron which suffered aluminum leakage without the integral dowels.

Preferred embodiments of the invention have been described in considerable detail. Many modifications and variations to the preferred embodiments described will be apparent to those skilled in the art. Therefore, the scope of the invention should not be limited to the preferred embodiments, but should be defined by the claims which follow.

What we claim is:

1. A component which is bolted to a support structure in which a bolt hole for securing said component to said structure extends through said component and into said structure, the improvement wherein:

said component is sintered powder metal and has an integral boss protruding from said component around said bolt hole.

2. The improvement of claim 1, wherein said boss is tapered.

3. The improvement of claim 1, wherein axial splines are provided on the outside of said boss.

4. The improvement of claim 1, wherein a lead-in radius is provided on a leading edge of said boss.

5. The improvement of claim 1, wherein said component is made of a liquid phase sintering powder metal material.

6. The improvement of claim 5, wherein said material is a powder metal alloy of iron containing phosphorus from ferrophosphorus powder.

7. The improvement of claim 6, wherein said material has a phosphorus content of 0.4 to 0.7% and a carbon content of 0 to 0.8%.

8. The improvement of claim 7, wherein said material has a copper content of 0 to 4%.

9. The improvement of claim 1, wherein a moat is formed in said component around a trailing end of said boss.

10. The improvement of claim 1, wherein said boss is oblong.

11. The improvement of claim 1, wherein said component has a planar surface which abuts a planar surface of said structure, and wherein a void is formed in said planar surface.

12. The improvement of claim 1, wherein said support structure has a counterbore around said bolt hole for receiving said boss.

13. The improvement of claim 1, wherein said hole in said structure is threaded.

14. In a casting insert which is placed in a casting die and has a material cast around it, said insert having at least one hole therein, the improvement wherein:

said insert is sintered powder metal and has an integral boss protruding from a surface of said insert around said hole.

* * * * *